(12) United States Patent
Sulzyc et al.

(10) Patent No.: US 6,623,016 B2
(45) Date of Patent: Sep. 23, 2003

(54) CONTROL SYSTEM FOR LIFTING AND LOWERING THE BODY OF AN AIR-SUSPENDED VEHICLE INCLUDING LEVEL CONTROL

(75) Inventors: Georg Sulzyc, Eppelheim (DE); Roland Blanz, Heiligkreuzsteinach (DE)

(73) Assignee: Haldex Brake Products GmbH, Heidelberg (DE)

( * ) Notice: Subject to any disclaimer, the term of this patent is extended or adjusted under 35 U.S.C. 154(b) by 0 days.

(21) Appl. No.: 10/100,474

(22) Filed: Mar. 15, 2002

(65) Prior Publication Data

US 2002/0096840 A1 Jul. 25, 2002

Related U.S. Application Data

(63) Continuation of application No. PCT/EP00/08920, filed on Sep. 13, 2000.

(30) Foreign Application Priority Data

Sep. 18, 1999 (DE) .......................................... 199 44 873

(51) Int. Cl.$^7$ ............................................... B60G 17/00
(52) U.S. Cl. ................ 280/5.514; 280/6.15; 280/6.157; 280/6.159; 280/124.16
(58) Field of Search .............................. 280/6.151, 6.15, 280/6.157, 5.5, 5.514, 6.159, 124.157, 124.16, FOR 100, FOR 101, FOR 155, FOR 171

(56) References Cited

U.S. PATENT DOCUMENTS

| 4,065,143 | A | * | 12/1977 | Iida ........................... 280/43.23 |
| 6,257,597 | B1 | * | 7/2001 | Galazin .................... 280/6.151 |
| 6,332,623 | B1 | * | 12/2001 | Behmenburg et al. . 280/124.16 |
| 6,431,557 | B1 | * | 8/2002 | Terborn et al. .......... 280/6.157 |

FOREIGN PATENT DOCUMENTS

| DE | 33 44 022 C1 | 6/1985 |
| DE | 35 06 179 C2 | 3/1993 |
| DE | 43 27 764 A1 | 2/1995 |
| EP | 0 398 008 A2 | 4/1990 |
| EP | 0 398 008 B1 | 4/1990 |
| EP | 0 487 928 A2 | 10/1991 |
| EP | 0 487 928 B1 | 10/1991 |
| EP | 0 520 147 B1 | 4/1992 |
| EP | 0 520 147 A1 | 4/1992 |
| FR | 2 709 095 | 8/1994 |

OTHER PUBLICATIONS

Translation of Abstract of German patent DE 33 44 022 C.

* cited by examiner

*Primary Examiner*—Eric Culbreth
(74) *Attorney, Agent, or Firm*—Thomas, Kayden, Horstemeyer & Risley

(57) ABSTRACT

A control system is designed to lift and lower the body of an air-suspended vehicle including an axle and level control. The system includes a source of compressed air, a plurality of air-suspension bellows each being associated with at least one axle and being designed and arranged to adjust a desired distance between the body and the axle, a path sensor being designed and arranged to sense and determine the distance between the body and the axle and to create and deliver a respective electric signal, a switching valve unit having a lifting position, a lowering position, a driving position and a stop position, an electronic control unit being designed and arranged to control the switching valve unit in response to the electric signal delivered by the path sensor, a first conduit branch being located between the source of compressed air and the air-suspension bellows, a second conduit branch being located between the source of compressed air and the air-suspension bellows, at least one level control valve located in the first conduit branch, and at least one locking valve being located in one of the conduit branches and including a spring, the locking valve being designed and arranged to be electrically switched to reach a first position and to be switched by the spring to reach a second position. The first conduit branch is designed and arranged to be activated in the second position, and the second conduit branch being designed and arranged to be activated in the first position.

30 Claims, 8 Drawing Sheets

CONTROL SYSTEM FOR LIFTING AND LOWERING THE BODY OF AN AIR-SUSPENDED VEHICLE INCLUDING LEVEL CONTROL

CROSS REFERENCE TO RELATED APPLICATIONS

This application is a continuation of International Application PCT/EP00/08920 with an International Filing Date of Sep. 13, 2000 and claiming the benefit of co-pending German Patent Application No. 199 44 873.6 entitled "Steueranlage zum Heben und Senken des Fahrzeugaufbaus von luftgefederten Fahrzeugen mit Niveauregelung", filed on Sep. 18, 1999.

FIELD OF THE INVENTION

The present invention generally relates to a control system for lifting and lowering the body of an air-suspended vehicle. With such systems, the desired distance between the body of the vehicle and the axle of the vehicle may be automatically adjusted. Additionally, it may be desired to design the system in a way that the body may be lifted and lowered, respectively, in an arbitrary way. Such an arbitrary adjustment may serve to adapt the height of the vehicle to the height of a loading platform to load or to unload the vehicle. The control system may also be designed in a way that different heights of the body with respect to the axle may be stored for later use. The system may be applied to motor vehicles as well as to trailers.

BACKGROUND OF THE INVENTION

A control system is known from German Patent No. 35 06 179 C2 The known control system includes a level control valve which serves to adjust the desired distance between the body and the axle of the vehicle when the system works correctly. The level control valve is combined with a path sensor to form one common unit. The path sensor sends an electric signal to an electronic control unit, the electric signal corresponding to the distance between the body and the axle of the vehicle. A switching valve unit is arranged downstream of the electronic control unit, the switching valve unit including a switching valve having four positions, namely a lifting position, a lowering position, a driving position and a stop position. The switching valve is designed in a two circuit way, meaning it serves to operate two air-suspension bellows, or two air-suspension bellow circuits. The electronic control unit is connected to a selector switch such that it allows for arbitrarily lifting and lowering the body. Arbitrarily lifting or lowering the body with respect to the axle may be desired to adapt the height of the vehicle to an existing loading platform, for example. Arbitrarily lifting and lowering the body of the vehicle is only possible during correct electric power supply of the known control system. Since electric supply usually is interrupted when trailers are parked at a loading platform, arbitrarily lifting and lowering is then no longer possible with the known system. In the case of power supply being interrupted—no matter whether this occurs due to a defect or consciously caused by the user—the switching valve of the known system remains in its present position. Consequently, the body cannot be lifted or lowered with respect to the axle in the known system. In the known system, this problem concerning a trailer being parked at a loading platform can only be solved by making sure that there always is correct electric power supply of the known control system.

Another control system for lifting and lowering the body of an air-suspended vehicle including level control is known from German Patent Application No. 43 27 764A1. The vehicle additionally includes a lifting axle. The known control system includes an electronic control unit including a switching valve unit. The switching valve unit includes a plurality of switching valves to be electrically controlled and to be controlled by a spring. The known arrangement is chosen such that the position of the switching valves that has been electrically caused is maintained even without power supply. In this way, the lifting axle remains in its present position even when power supply is turned off, or when power supply fails. In this way, reduced consumption of power is achieved. However, when power supply fails, lifting and lowering of the body of the known vehicle is not possible.

SUMMARY OF THE INVENTION

The present invention relates to a control system for lifting and lowering the body of an air-suspended vehicle. The vehicle—which may be a motor vehicle or a trailer, for example—includes an axle and level control. The system includes a source of compressed air, a plurality of air-suspension bellows each being associated with at least one axle and being designed and arranged to adjust a desired distance between the body and the axle, a path sensor being designed and arranged to sense and determine the distance between the body and the axle and to create and deliver a respective electric signal, a switching valve unit having a lifting position, a lowering position, a driving position and a stop position, an electronic control unit being designed and arranged to control the switching valve unit in response to the electric signal delivered by the path sensor, a first conduit branch being located between the source of compressed air and the air-suspension bellows, a second conduit branch being located between the source of compressed air and the air-suspension bellows, at least one level control valve being located in the first conduit branch, and at least one locking valve being located in one of the conduit branches and including a spring, the locking valve being designed and arranged to be electrically switched to reach a first position and to be switched by the spring to reach a second position. The first conduit branch is designed and arranged to be activated in the second position, and the second conduit branch being designed and arranged to be activated in the first position. The present invention also relates to a controlling installation and to a control apparatus for lifting and lowering the body of an air-suspended vehicle.

The novel control system may also be used on trailers, and it is designed to be automatically active even when there is no power supply. It is important that the locking valves may be electrically switched to reach a first position, and that they may be mechanically switched to reach a second position. In this way, the first ("electrical") position is only taken during correct power supply, while mechanical-pneumatic operation is used during interruption of power supply. The second position is the fallback position, or—in other words—the fallback plane. Depending on the fact whether the control system operates electrically or mechanical-pneumatically, the respective other conduit branch is caused to be ineffective—or at least its effects are substantially reduced—in a way that it does not have a substantial influence on the compressed air prevailing in the air-suspension bellows. The locking valve has two positions of which one is a locking position in which the connected parts of the conduits are locked with respect to one another. The second position is a passage position or a release position in which the respective connected conduit parts are interconnected.

A first embodiment of the novel control system includes a locking valve being located in the conduit branch upstream or downstream of the level control valve. This locking valve has a passage position to be caused and adjusted, respectively, by a spring, and a locking position to be electrically adjusted. It is especially preferred to arrange the locking valve downstream or after the level control valve such that the switching valve unit may be arranged in the other conduit branch. The first conduit branch in which the level control valve is arranged and which may extend to the air-suspension bellows is locked during correct power supply such that the switching valve unit may operate the air-suspension bellows without any loss of air. However, it is also possible to arrange the locking valve in the first conduit branch in which the level control valve is arranged and upstream or in front of the level control valve. A slight loss of compressed air occurring at the level control valve due to pushing movements and vibrations during travel of the vehicle is acceptable.

Another possibility is to arrange the locking valve in the second conduit branch in which the level control valve is not arranged. The locking valve then has a locking position to be caused by the spring, and a passage position to be electrically adjusted. When the locking valve is arranged in the conduit branch in which the level control valve is not located, it has to have an inverse design in a way that its positions are designed to be controlled in an inversed way. The electric control is associated with the passage position such that the level control valve is by-passed or evaded during correct power supply. On the other hand, when power supply fails, or when power supply is interrupted, the by-pass conduit of the level control valve is locked such that the level control valve automatically fulfills its mechanical-pneumatic function.

It is also possible that there are two locking valves, each of the locking valves being arranged in one of the two conduit branches. The two locking valves each have a locking position and a passage position. The passage position of the locking valve being arranged in the conduit branch in which the level control valve is arranged is designed to be adjusted by the spring. The passage position of the other locking valve is designed to be electrically adjusted by the electronic control unit. The achieved double arrangement of two locking valves each being located in one of the conduit branches is more complicated than the single design, but it also capable of realizing the desired function with a fallback position. Furthermore, the double design arrangement prevents the level control valve from consuming air during correct power supply. It is still possible to chose the lengths of the conduit branches to be longer or shorter. The two conduit branches usually start directly after the source of compressed air, meaning close to a compressed air reservoir or the like. The branch location being associated with the air-suspension bellows may be arranged at different distances with respect to the air-suspension bellows. It is also possible to arrange a two way valve at this branch location to prevent backflow at this position.

Furthermore, it is possible that a common locking valve is arranged at the branch location of the two conduit branches close to the source of compressed air. The common locking valve in the position to be switched by the spring connects the source of compressed air with the conduit branch in which the level control valve is arranged, and it locks the other conduit branch. In the position to be reached by switching the electric control unit, the common locking valve connects the source of compressed air with the conduit branch in which the level control valve is not arranged, and it locks the conduit branch in which the level control valve is arranged. Such a common locking valve fulfills the functions of two locking valves each being located in one of the two conduit branches. It may have a structurally advantageous design by only including two positions. In the first position, the first conduit branch is supplied with compressed air, and the second conduit branch is locked. In the second position, the first conduit branch is locked, and the second conduit branch is supplied with compressed air. Accordingly, electric control and control by the spring are respectively associated.

It is also possible that a common locking valve is arranged at the branch location of the two conduit branches next to the air-suspension bellows. The common locking valve has a first position to be switched by the spring in which the conduit branch in which the level control valve is arranged is connected to the air-suspension bellows, and the other conduit branch is locked. In the second position to be switched by the electric control unit, the common locking valve connects the conduit branch in which the level control valve is not arranged to the air-suspension bellows, and it locks the other conduit branch. In this way, the common locking valve may also be arranged at the other branch location of the two conduit branches, meaning at the side of the air-suspension bellows.

All the above described embodiments may be combined with a switching valve unit including two switching valves being arranged in series. The two switching valves are designed to be switched electrically and by a spring. Due to the arrangement of the two switching valves in series, there is a sufficient number of the different combinations of the lifting position, the lowering position, the driving position and the stop position. The switching valve unit may be arranged in the conduit branch in which the level control valve is not arranged, or in a common conduit being located downstream and leading to the air-suspension bellows.

Furthermore, it is possible that the switching valve unit includes a switching valve at least having three positions, meaning a lowering position, a lifting position and a position which is the stop position and the driving position at the same time. The switching valve is designed to be switched electrically and by a spring. These three positions of the switching valve are sufficient since the stop position and the driving position are combined as one position. Such a design is advantageous since there is no consumption of air when the vehicle is driven and when there is correct power supply and correct distance between the body of the vehicle and the axle of the vehicle. In all exemplary embodiments, it is important that the locking valve as well as the switching valve unit are designed to be switched by a spring to reach a certain position corresponding to the fallback position, meaning the position which is active during interrupted power supply.

Furthermore, it is possible that the switching valve and the locking valve are designed as one common structural unit. Such an arrangement is especially advantageous, and it may be produced at low cost. The arrangement of the two conduit branches and a common valve unit fulfilling the functions of the switching valve and the functions of the locking valve are only required. The level control valve may be designed to include the path sensor, meaning the path sensor is integrated into the level control valve. On the other hand, it is also possible that the level control valve and the path sensor are not designed as one common structural unit, meaning they may be designed as separate units. In all cases, the electric signal to be created and transmitted by the path sensor is processed by the electronic control unit.

In all the above described exemplary embodiments, the switching valve unit may be located in the conduit branch in which the level control valve is not located. On the other hand, the switching valve unit may also be located downstream or after the branch location—or, in other words, the junction location—of the two conduit branches or line branches, meaning directly upstream of the air-suspension bellows.

Furthermore, it is possible that the two "parallel" conduit branches are joined by a two way valve, and that the switching valve unit is located in a common conduit leading to the air-suspension bellows. The two way valve fulfills its known function, meaning it transmits the increased inlet pressure towards the outside.

It is especially advantageous if the electronic control unit is designed to process an electric signal corresponding to the driving condition of the vehicle. Such an electric signal usually is supplied by an antilock system (ABS) or an electronic brake system (EBS), and it may be processed and used in the electronic control unit. The electronic control unit may be designed as a separate unit, or to be structurally combined with the electronic control unit of the ABS system or of the EBS system.

In all cases, it is possible that the level control valve and the path sensor are designed to form one common unit. Such integrated designs are known in the art. However, they are not used in combination with usual electric actuation and pneumatic-mechanical actuation as a fallback position. In the case of such a structural combination, the existing actuation drive of the level control valve may be simultaneously used as the mechanical component of the path sensor.

Furthermore, there is the possibility of the electric control unit including a selector switch and/or a control valve for arbitrarily lifting and lowering the body of the vehicle being located in the conduit branch in which the level control valve is arranged. The control valve is designed to be manually operable. Such a selector switch fulfills the function of allowing for arbitrarily lifting and lowering the body of the vehicle during correct power supply. The selector switch may also be designed to fulfill additional functions, for example, to store a second height of the body of the vehicle with respect to the axle of the vehicle or the like. Correspondingly, a control valve being manually operable is arranged in the conduit branch in which the level control valve is arranged. The control valve is designed and arranged to realize similar functions in the fallback position.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
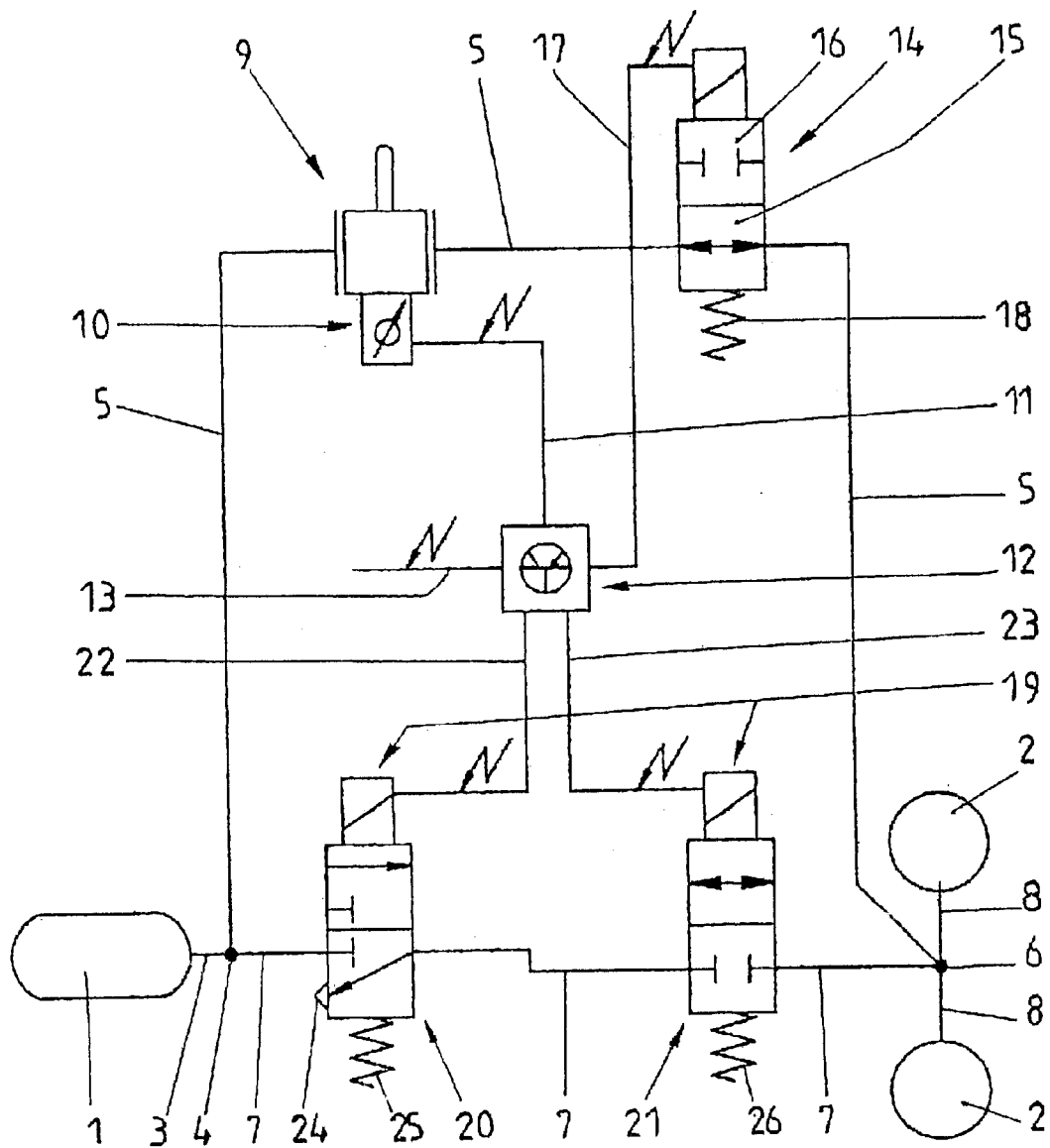
FIG. 1 is a view of a first exemplary embodiment of the novel control system during correct power supply and when the units are currentless—meaning without an effect of the electronic control unit.

Referring now in greater detail to the drawings, FIG. 1 illustrates the novel control system for lifting and lowering the vehicle body of air-suspended motor vehicles including level control. The control system includes a source of compressed air 1. For example, the source of compressed air 1 may be designed as a reservoir for compressed air, the reservoir being supplied with compressed air by a compressed air supply system (not illustrated) in a known way. The control system serves to set a desired distance between the body of the vehicle and the axle of the vehicle by controlling it. Air-suspension bellows 2 are located between the body of the vehicle and the axle of the vehicle. Usually, the air-suspension bellows 2 are associated with the axles of the respective motor vehicle. A conduit 3 leads from the source of compressed air 1 to a branch location 4. It is to be understood that the branch location 4 may also be arranged directly at the source of compressed air 1. A first conduit branch 5 begins at the branch location 4, the conduit branch 5 ending at a second branch location 6. A second conduit branch 7 begins at the branch location 4, and it ends at the branch location 6. Conduits 8 lead from the branch location 6 to the respective air-suspension bellows 2. FIG. 1 only illustrates the two air-suspension bellows 2 of one axle of the motor vehicle. It is to be understood that the system may also have a multi-circuit design or another branch location leading to additional air-suspension bellows of other axles of the motor vehicle.

A level control valve 9 is arranged in the first conduit branch 5. To some extent, the level control valve 9 has a design known in the art. The level control valve 9 includes a mechanical actuation drive being interconnected between the body of the vehicle and the axle of the vehicle in a way that movements of the body of the vehicle with respect to the axle of the vehicle in a vertical direction are transmitted to the level control valve 9 in a known way. However, the design of the level control valve 9 differs from known designs of level control valves as it includes a path sensor 10. The path sensor 10 is integrated into the level control valve 9. The path sensor 10 is designed and arranged to create an electric signal corresponding to the respective path, meaning the distance between the body of the vehicle and the axle of the vehicle. The electric signal is to be sent to an electronic control unit 12 by an electric line 11. The control unit 12 is designed and arranged to process the signal. The electronic control unit 12 is supplied with power by a line 13.

A stop valve 14 is located in and connected to, respectively, the conduit branch 5. In the exemplary embodiment of the novel system as illustrated in FIG. 1, the stop valve 14 is located in the conduit branch 5 upstream of the level control valve 9. The stop valve 14 has a passage position 15 and a locking position 16. The stop valve 14 may also be called a passage valve including a locking function. The stop valve 14 is designed as a solenoid valve, and it may be electrically controlled by an electric line 17 coming from the electronic control unit 12. When the valve magnet is excited due to electric control, the stop valve 14 moves to reach the locking position 16 such that the conduit branches 5 are locked with respect to one another. Consequently, the entire conduit branch 5 is locked. Thus, the entire conduit branch 5 does not have a function in a way that movements of the level control valve 9 do not effect the value of the pneumatic pressure prevailing in the air-suspension bellows 2. The stop valve 14 additionally includes a spring 18 being designed and arranged to move the stop valve 14 to reach its passage position 15 when power supply of the electronic control unit 12 via the line 13 is interrupted, when a different electric defect occurs, or when the electronic control unit 12 does not transmit a signal via the line 17 such that the valve magnet of the stop valve 14 is not excited. In all these cases, the force of the spring 18 has the effect of the passage position 15 being reached. The passage position corresponds to the fall back position in a way that different sections of the conduit branch 5 are interconnected, and that the level control valve 9 may respectively effect the air-suspension bellows 2.

A switching valve unit 19 including two switching valves 20 and 21 is located in the conduit branch 7. The switching valve 20 is controlled by the electronic control unit 12 via an electric line 22. Correspondingly, an electric line 23 leads from the control unit 12 to the switching valve 21. The switching valve 20 includes its own ventilation 24 and a spring 25. The switching valve 20 is capable of reaching two positions. When the valve magnet is not excited, the force of the spring 25 has the effect of the part of the conduit branch 7 close to the branch location 4 being locked (as illustrated), whereas the part of the conduit branch 7 connecting the two switching valves 20 and 21 is deaerated. The switching valve 20 may be electrically controlled to reach its other position in which the ventilation 24 is locked, and in which the two parts of the conduit branch 7 being connected thereto are interconnected, meaning that they allow for passage. The switching valve 21 of the valve unit 19 does not include its own ventilation unit, but also has a spring 26. The switching valve 21 of the switching valve unit 19 is designed and arranged to reach two positions. In the first position in which the valve magnet is not excited, the force of the spring 26 has the effect of the two parts of the conduit branch 7 being connected thereto being locked with respect to one another. This position corresponds to the stop position in a way that the compressed air being located in the air-suspension bellows 2 is locked and closed up. When the valve magnet of the switching valve 21 being designed as a solenoid valve is excited by sending a respective control signal from the control unit 12 via the line 23 to the switching valve 21, the switching valve 21 takes its other illustrated position in which the two parts of the conduit branch 7 being connected thereto are interconnected.

The singular structural elements of the control system according to FIG. 1 are illustrated in their currentless condition. Consequently, the switching valve 14 takes the illustrated position due to the force of the spring 18, and the switching valves 20 and 21 take their illustrated positions due to the springs 25 and 26. The conduit branch 7 is interrupted at the switching valve 21, and there is connection in the conduit branch 5. In this way, the conduit branch 5 and the fallback plane may be used. The level control valve 9 is capable of fulfilling its mechanical-pneumatic function in the fallback plane. The desired distance between the body of the vehicle and the axle of the vehicle is adjusted by respective lifting or lowering of the body of the vehicle. Such a currentless condition may be achieved when a trailer is uncoupled from the truck at a loading platform, for example, and there consequently is no electric supply. Nevertheless, all necessary functions are fulfilled. On the other hand, when there is correct power supply—as it is the case with on a truck or on a trailer being coupled to a truck—the electronic control unit 12 switches the locking valve 14 to reach its locking position 16 such that the conduit branch 5 is not effective. Depending on the requirements, the switching valves 20 and 21 are switched by the electronic control unit 12 such that either lifting or lowering of the body of the vehicle is initiated, or—in the case of the desired distance already existing between the body of the vehicle and the axle of the vehicle—the stop position or the drive position is reached and adjusted, respectively. The respectively necessary controlling process is exclusively effected by the switching valve unit 19 including the two switching valves 20 and 21 being located in the parallel conduit branch 7.

Figure 2:
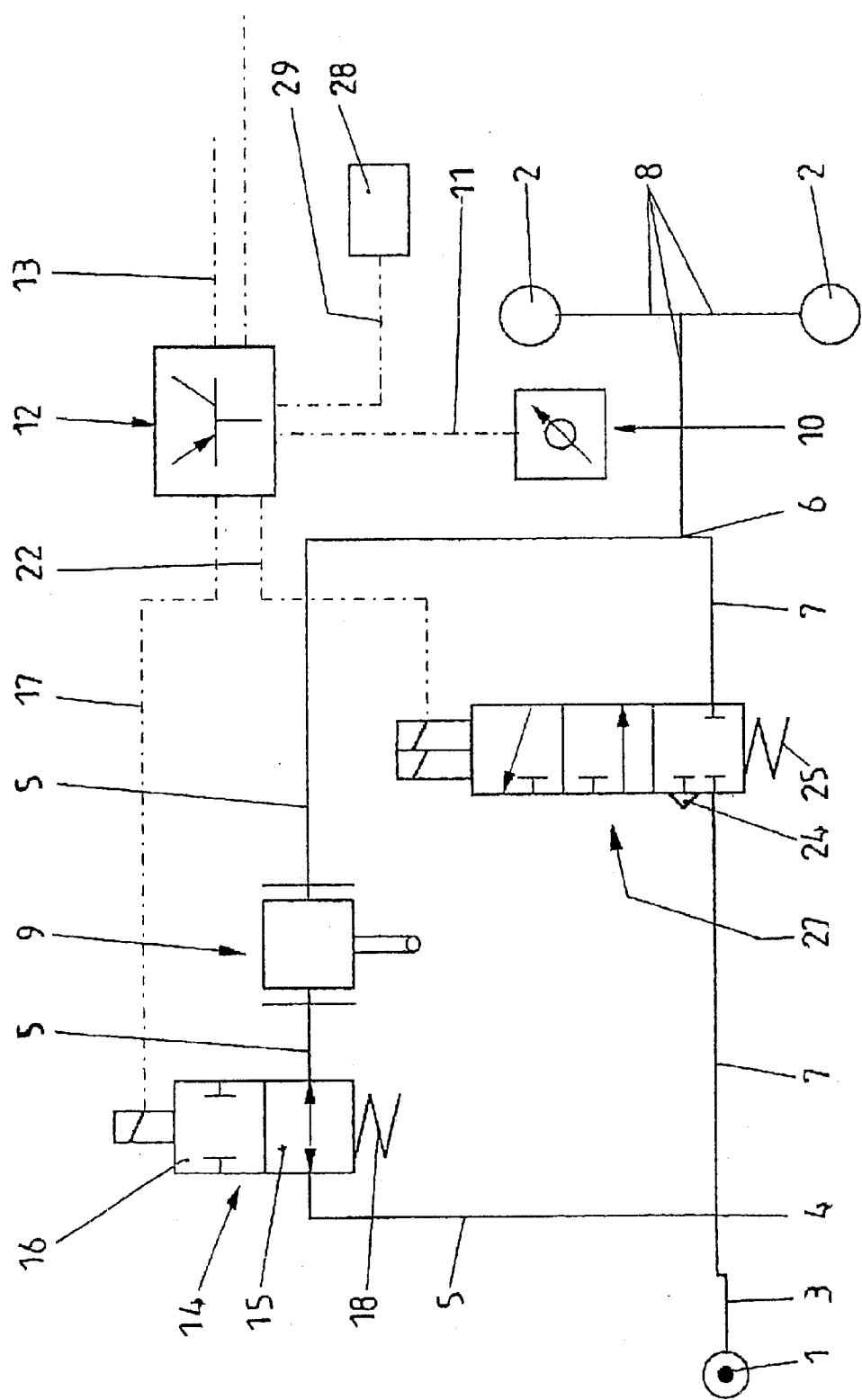
FIG. 2 is a view of a second exemplary embodiment of the novel control system when it is currentless, the valve units being located in the position in which they are also located when power supply has failed or has been interrupted.

FIG. 2 illustrates a second exemplary embodiment of the novel control system. It may be partly referred to the above description of the control system according to FIG. 1. Again, the two conduit branches 5 and 7 are located between the branch locations 4 and 6. The level control valve 9 is located in the conduit branch 5. The locking valve 14 is located upstream of the level control valve 9. The valve unit 19 being located in the conduit branch 7 only includes one single switching valve 27 having three positions, as illustrated. Two of the three positions may be switched by the electronic control unit 12 and the electric line 22, while the spring 25 causes the third position. The path sensor 10 is designed as a separate singular structural component, meaning it is not integrated into the level control valve 9. Additionally, there is a selector switch being mechanically operable and being connected to the electronic control unit 12 by an electric line 29. The selector switch 28 serves to arbitrarily lift and lower the body of the vehicle during correct power supply. Furthermore, it may be designed to fulfill additional functions as, for example, to store a second height or the like. It may be seen from a comparison of the exemplary embodiments of FIGS. 1 and 2 that it is possible to arrange the locking valve 14 upstream or downstream of the level control valve 9 in the conduit branch 5. Additionally, it is clear that the switching valve unit 19 may have a variety of designs. It is located in the parallel conduit branch 7. Operation of the control system according to FIG. 2 is mostly similar to the one of FIG. 1, and it therefore does not need to be explained in greater detail.

Figure 3:
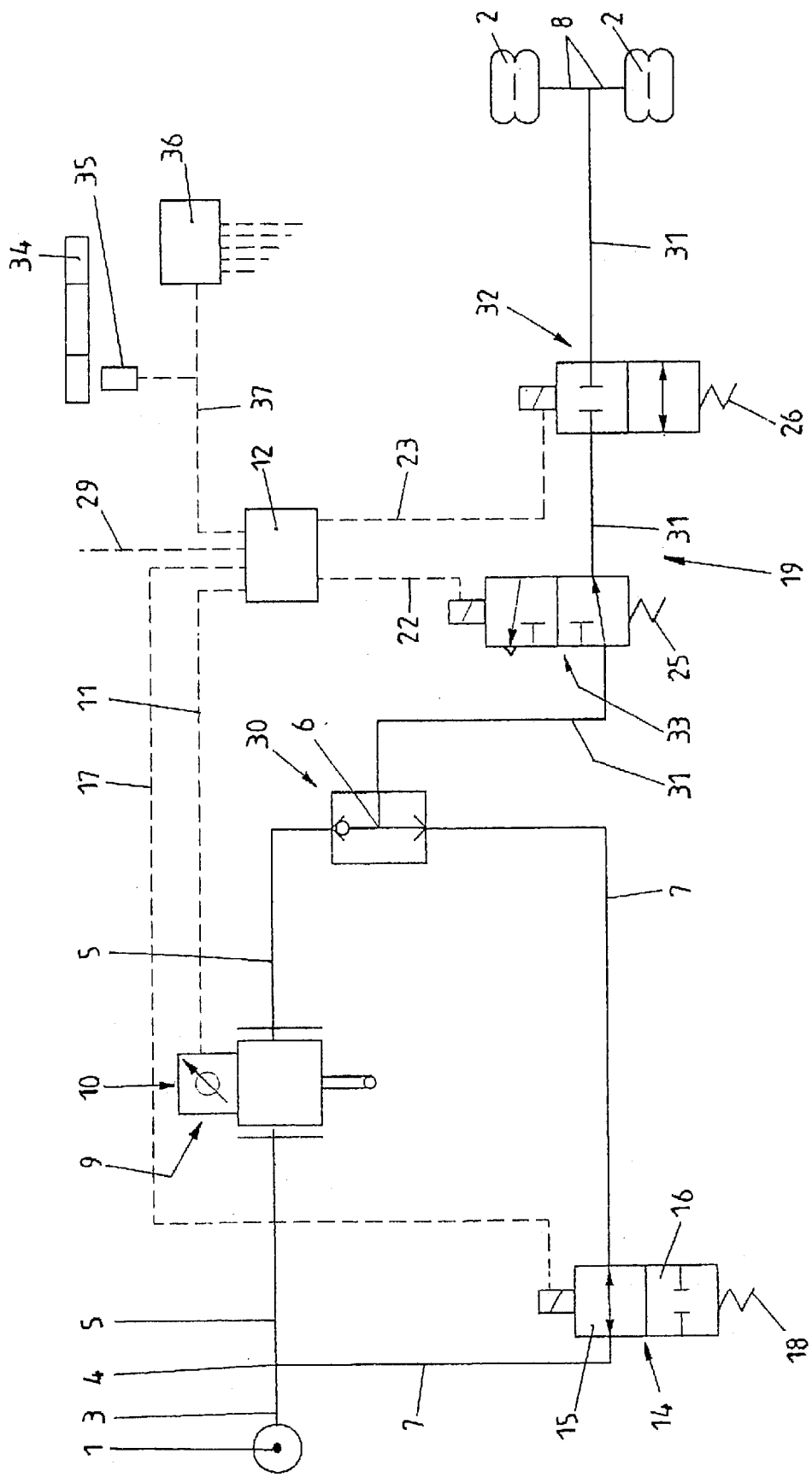
FIG. 3 is a view of a third exemplary embodiment of the novel control system showing the elements during correct power supply of the control system in the driving position.

The control system illustrated in FIG. 3 is identical with or similar to the above described exemplary embodiments to a great extent. As a difference, the locking valve 14 is located in the "parallel" conduit branch 7. A two way valve 30 is located in the branch location 6, the two way valve 30 having a usual design well known in the art. The two way valve 30 has two inlets being connected to the conduit branches 5 and 7. It is designed in a way that the higher pressure may pass, and that it may be controlled at the outlet. A conduit 31 starts at the branch location 6, the conduit 31 leading to the conduits 8 and to the air-suspension bellows 2. The switching valve unit 19 is not located in the conduit branch 7, but in the conduit 31. The switching valve unit 19 includes two switching valves 32 and 33 having a slightly modified design compared to the switching valves 20 and 21 of FIG. 1. This at least applies to the design of their positions. For more details, it is referred to the illustration of FIG. 3. The two switching valves 32 and 33 include springs 25 and 26, and they may be switched by the electronic control unit 12 via electric lines 22 and 23, respectively. The switching valve 32 is designed as a 3/2 way valve. The switching valve 33 is designed as a 2/2 way valve. Furthermore, there are a magnet wheel 34, a speed sensor 35 and an antilock system (ABS) and an electronic brake system (EBS) 36. The speed sensor 35 and the ABS/EBS system are connected to the electronic control unit 12 by electric lines 37 such that, for example, a signal representing the condition of the vehicle may be processed in the control unit 12. The singular structural components of the control system are illustrated in their positions during correct power supply and in the driving position. The function may be well seen from FIG. 3.

Figure 4:
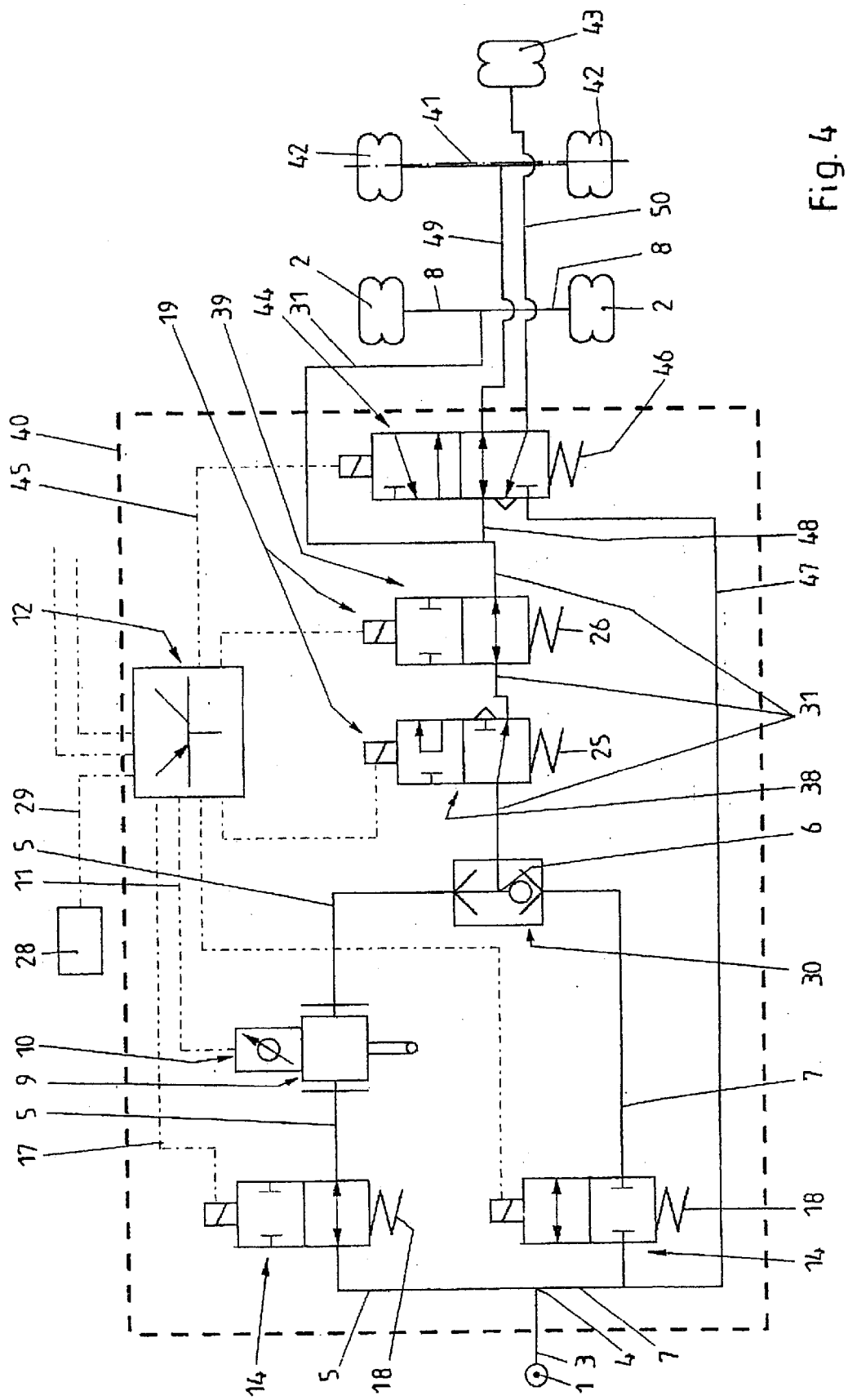
FIG. 4 is a view of a fourth exemplary embodiment of the novel control system during currentless condition of the singular system elements.

The exemplary embodiment of the novel control system according to FIG. 4 is similar to the ones of FIGS. 3 and 2. A locking valve 14 including a spring 18 is arranged in the conduit branch 5 as well as in the conduit branch 7. The different positions are inversely arranged, as it corresponds to the effective combination. The switching valve unit 19 is located in the conduit 31 starting at the branch location 6. In this case, the switching valve unit 19 includes two modified switching valves 38 and 39. The switching valves 38 and 39 may be switched to reach the illustrated position by springs 25 and 26. They may be electrically switched by the control unit 12 to reach the other position. A structural unit 40 illustrated by the dashed line may include the singular structural elements and the conduits. The control unit according to FIG. 4 is illustrated in its currentless condition, and it is designed for a vehicle including a lifting axle. The lifting axle 41 includes air-suspension bellows 42 and a lifting bellow 43. An axle lifting valve 44 serves to supply the air-suspension bellows 42 and the lifting bellow 43. The axle lifting valve 44 is designed as a 5/2 way valve, and it may be electrically controlled by an electric line 45 by the control unit 12. The axle lifting valve 44 also includes a spring 46 to take the respectively illustrated position in the currentless condition. The axle lifting valve 44 is supplied with compressed air by a conduit 47 branching off the conduit branch 7 and by the source of compressed air 1. Another conduit 48 allows for a connection to the conduit 31. A conduit 49 at the outlet side leads to the air-suspension bellows 42, and a conduit 50 leads to the lifting bellow 43. The axle lifting valve 44 may also be part of the structural unit 40.

Figure 5:
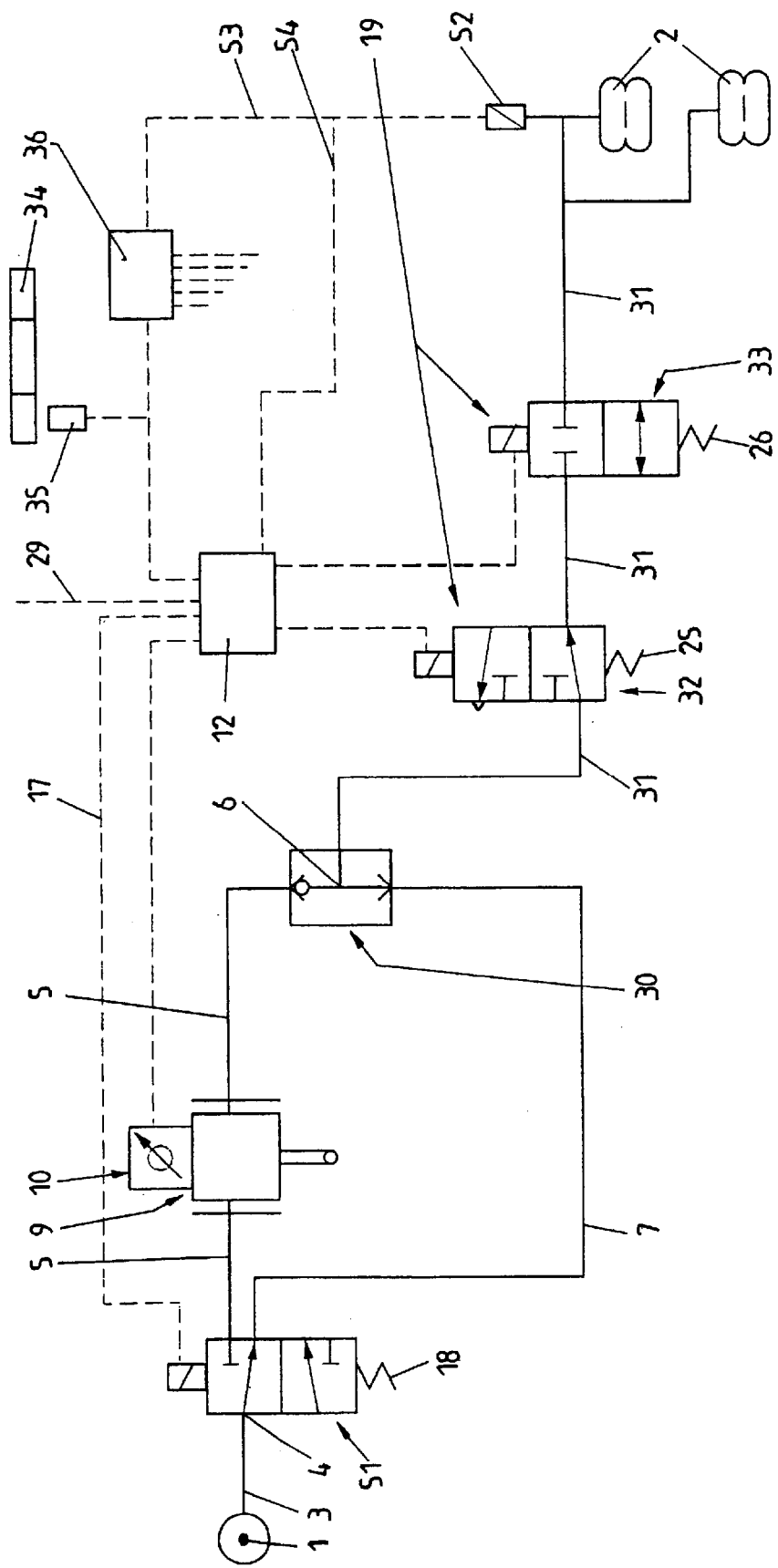
FIG. 5 is a view of another exemplary embodiment of the novel control system during correct power supply and in the driving position.

FIG. 5 illustrates the novel control unit for lifting and lowering the body of a air-suspended vehicle. The system is illustrated in the position of correct power supply and in the driving position. The two functions of the two control valves 14 according to FIG. 4 are combined in one common control valve 51 being arranged in the branch location 4 of the two conduit branches 5 and 7. The control valve 51 also includes a spring 18. It only has the two illustrated positions in which one of the conduit branches 5 and 7, respectively, is locked. The control valve 51 is designed and arranged to be electrically controlled by the electronic control unit 12 via the line 17. The other position in the non-excited position is caused by the force of the spring 18. The level control valve 9 including the integrated path sensor 10 is also arranged in the branch conduit 5. As it has already been described with reference to FIG. 3, the switching valve unit 19 includes two switching valves 32 and 33. A two way valve 30 is located at the branch location 6. A pressure sensor 52 which may also be designed as a pressure switch serves to sense and determine the pressure prevailing in the air-suspension bellows 2. The pressure sensor 52 sends respective signals to the ABS/EBS system 36 and to the electronic control unit 12 via an electric line 53. In this way, the pressure in the air-suspension bellows 2 is watched, and—if necessary—it is changed in a controlled manner.

Figure 6:
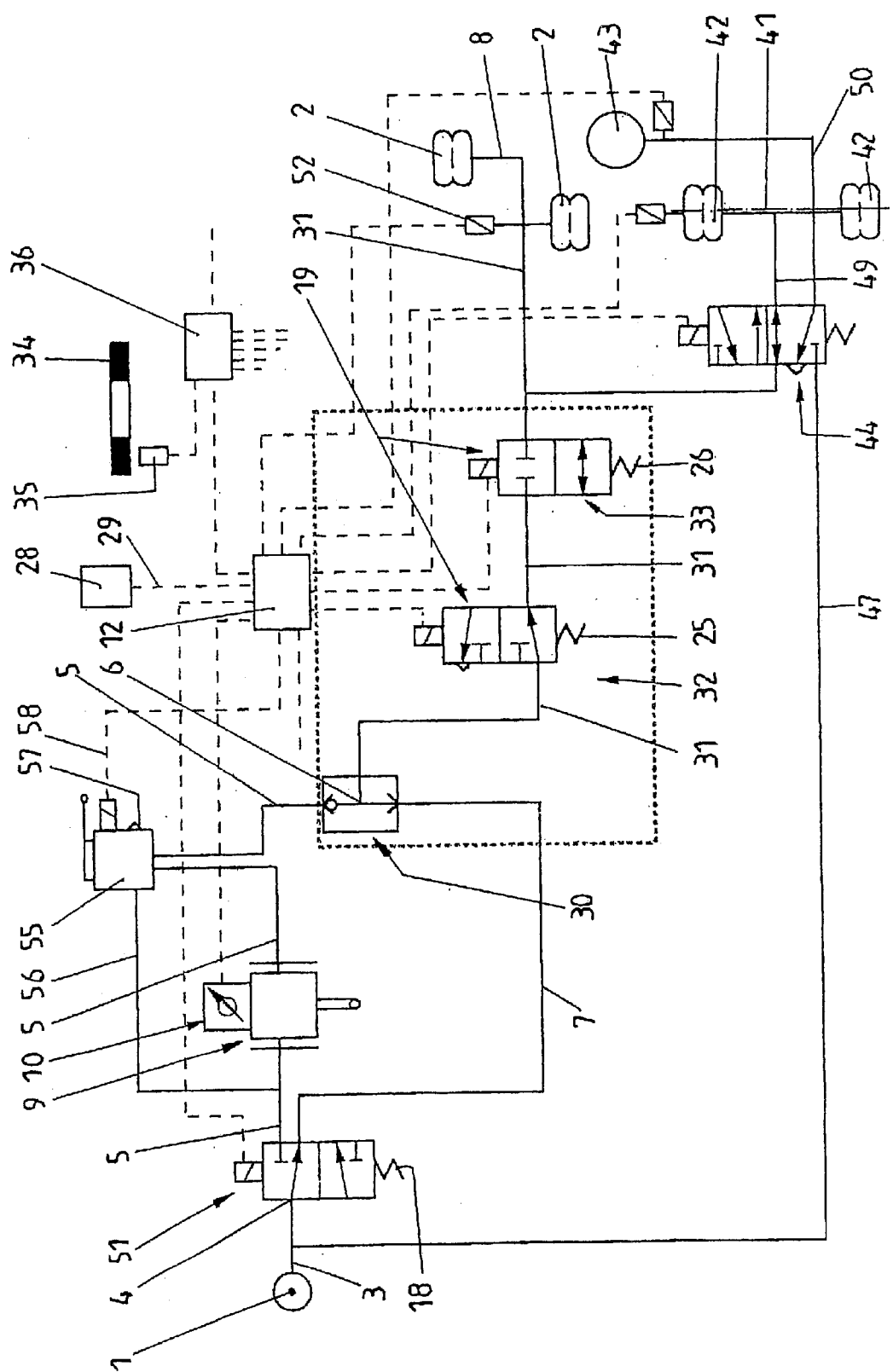
FIG. 6 is a view of another exemplary embodiment of the novel control system during correct power supply and in the driving position, as adapted to a vehicle including a lifting axle.

FIG. 6 illustrates another exemplary embodiment of the novel control system. The control system is similar to the ones illustrated in FIGS. 4 and 5. As it has already been described with respect to FIG. 5, the control valve 51 is arranged in the branch location 4 for the two conduit branches 5 and 7. The illustrated control system is adapted for a vehicle including a lifting axle 41. Additionally, it includes an axle lifting valve 44 similar to the system of FIG. 4. Furthermore, a control valve 55 is located in the conduit branch 5 downstream of the level control valve 4. The control valve 55 is designed to be manually operable. The control valve 55 serves to manually lift and lower the body in the fallback position—meaning when electric power supply fails or is interrupted. The control valve 55 is supplied with compressed air by a conduit 56. It includes its own ventilation 57 to lower the body of the vehicle. Additionally, the control valve 55 may be switched to reach the driving position by the electronic control unit 12 and a line 58 when readjustment after reoccurring correct power supply and the beginning of travel has been forgotten.

Figure 7:
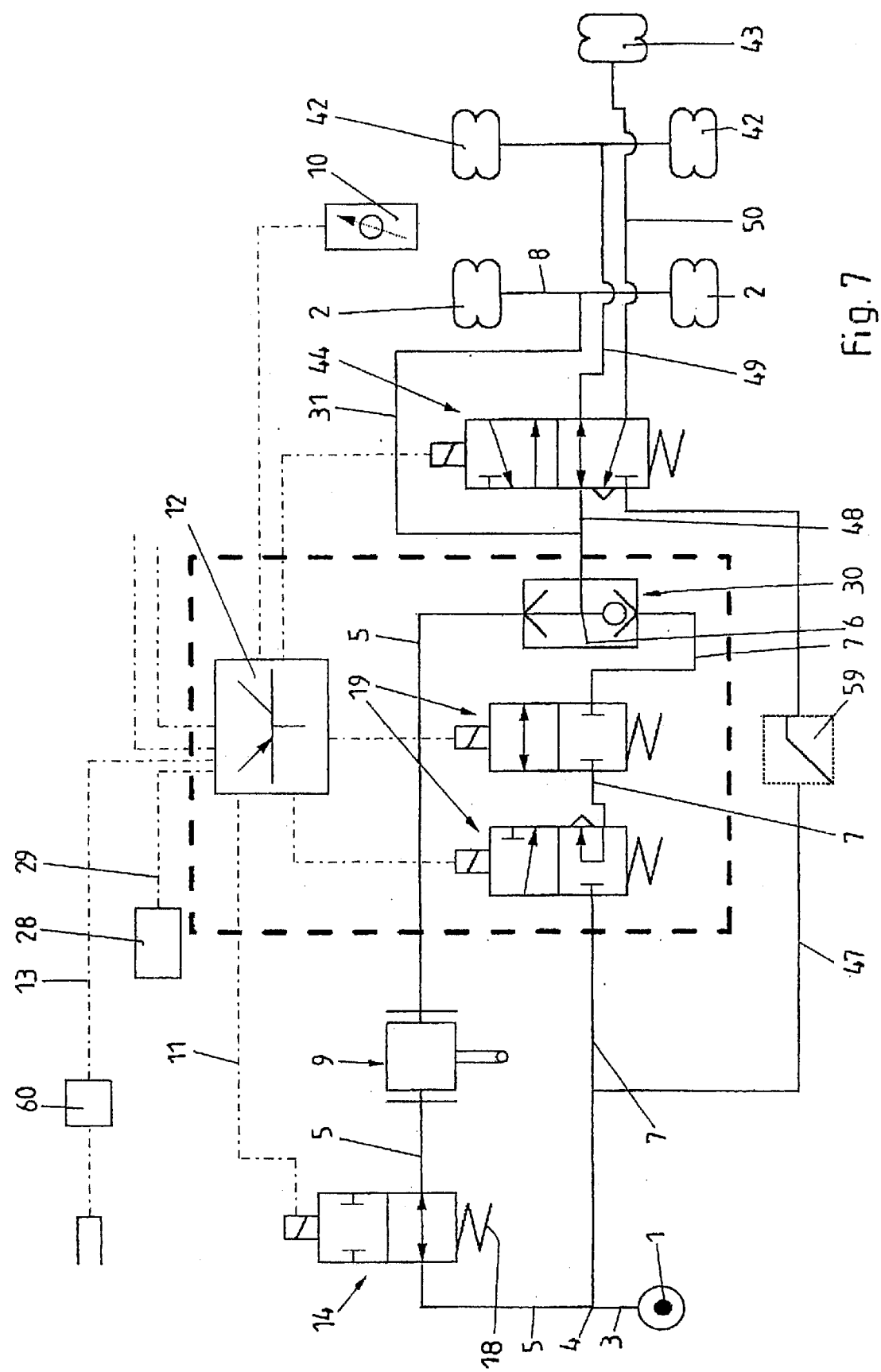
FIG. 7 is a view of another exemplary embodiment of the novel control system in the currentless condition in a vehicle in which the lifting axle is located in the lowered position.

Generally, the exemplary embodiment of the novel control system of FIG. 7 is similar to the ones described hereinbefore. The switching valve unit 19 is located in the second conduit branch 7. The level control valve 9 and the locking valve 14 are located in the first conduit branch 5. The system includes an axle lifting valve 44 serving to control the air-suspension bellows 42 and the lifting bellow 43. The axle lifting valve 44 is supplied with compressed air via the conduit 47. A pressure limiting valve 59 is located in the conduit 47 to limit forces occurring in the lifting bellow 43. A switch 60 is located in the electric line 13 by which the electronic control unit 12 is supplied with potential. The switch 60 is designed to be arbitrarily operable to make it possible to attain the condition of no power supply of the electronic control unit 12 in an arbitrary way.

Figure 8:
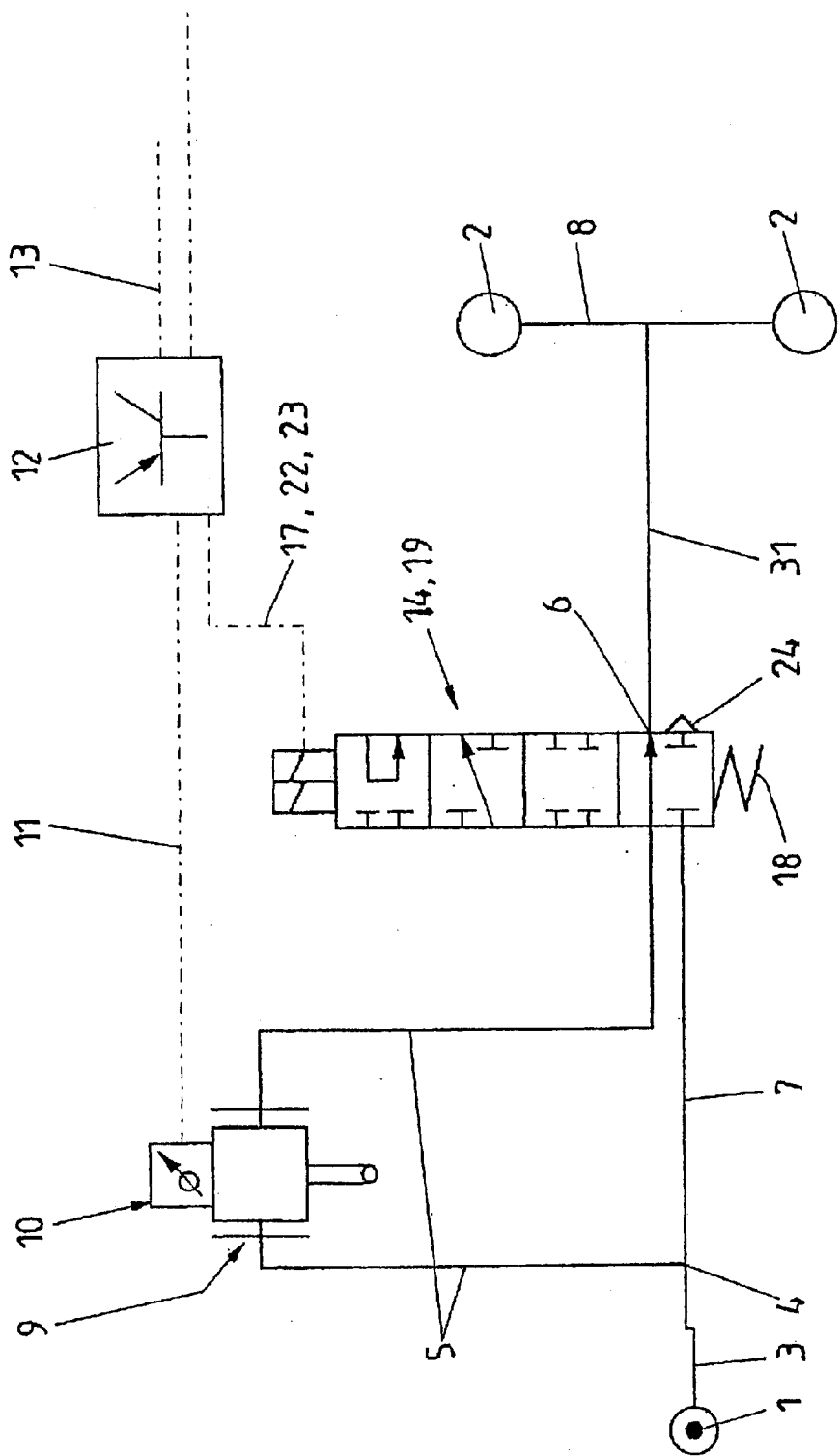
FIG. 8 is a view of another exemplary embodiment of the novel control system in the currentless condition.

FIG. 8 illustrates another exemplary embodiment of the novel control unit. The illustrated embodiment of the control unit has an especially simple design. Again, there are the two conduit branches 5 and 7. The level control valve 9 is located in the conduit branch 57. The level control valve 9 includes the integrated path sensor 10. A locking valve 14 and the switching valve unit 19 are located in the branch location 6. The branch location 6 faces the air-suspension bellows 2, and it combines the two conduit branches 5 and 7. The locking valve 14 and the switching valve unit 19 are designed as one 4/4 way valve. The valve unit may be electrically controlled by the electronic control unit 12, and by a spring 18 to reach the illustrated currentless position in which the level control valve 9 fulfills its desired function. It may also be seen from FIG. 8 that the locking valve of FIG. 5 may be arranged at the branch location 6. On the other hand, the common valve of FIG. 8 may also be arranged at the branch location 4.

Many variations and modifications may be made to the preferred embodiments of the invention without departing substantially from the spirit and principles of the invention. All such modifications and variations are intended to be included herein within the scope of the present invention, as defined by the following claims.

We claim:

1. A control system for lifting and lowering the body of an air-suspended vehicle including an axle and level control, comprising:
   a source of compressed air;
   a plurality of air-suspension bellows each being associated with at least one axle and being designed and arranged to adjust a desired distance between the body and the axle;
   a path sensor being designed and arranged to sense and determine the distance between the body and the axle and to create and deliver a respective electric signal;
   a switching valve unit having a lifting position, a lowering position, a driving position and a stop position;
   an electronic control unit being designed and arranged to control said switching valve unit in response to the electric signal delivered by said path sensor;
   a first conduit branch being located between said source of compressed air and said air-suspension bellows;
   a second conduit branch being located between said source of compressed air and said air-suspension bellows;
   at least one level control valve being located in said first conduit branch; and
   at least one locking valve being located in one of said conduit branches and including a spring, said locking valve being designed and arranged to be electrically switched to reach a first position and to be switched by said spring to reach a second position,
   said first conduit branch being designed and arranged to be activated in said second position, and said second conduit branch being designed and arranged to be activated in said first position.

2. The control system of claim 1, wherein said first position to be electrically caused is a passage position, and wherein said second position to be caused by said spring is a locking position.

3. The control system of claim 2, wherein said locking valve is located in said first conduit branch and upstream of said level control valve.

4. The control system of claim 2, wherein said locking valve is located in said first conduit branch and downstream of said level control valve.

5. The control system of claim 2, wherein said locking valve is arranged in said second conduit branch.

6. The control system of claim 1, comprising:
   a first locking valve being arranged in said first conduit branch and having a locking position and a passage position, the passage position being designed to be adjustable by said spring; and
   a second locking valve being arranged in said second conduit branch and having a locking position and a passage position, the passage position being designed to be adjustable by said electronic control unit.

7. The control system of claim 1, further comprising:
   a first branch location connecting said first conduit branch and said second conduit branch, said first branch location being located close to said source of compressed air; and
   a common locking valve being located at said first branch location and including a spring, said common locking valve being designed and arranged to be electrically switched to reach a first position and to be switched by said spring to reach a second position,
   said source of compressed air being connected to said second conduit branch and said first conduit branch being locked in said first position, and
   said source of compressed air being connected to said first conduit branch and said second conduit branch being locked in said second position.

8. The control system of claim 1, further comprising:
   a branch location connecting said first conduit branch and said second conduit branch, said branch location being located next to said air-suspension bellows; wherein
   said locking valve is designed as a common locking valve being located at said first branch location and including a spring, said common locking valve being designed and arranged to be electrically switched to reach a first position and to be switched by said spring to reach a second position,
   said air-suspension bellows being connected to said second conduit branch and said first conduit branch being locked in said first position, and
   said air-suspension bellows being connected to said first conduit branch and said second conduit branch being locked in said second position.

9. The control system of claim 1, wherein said switching valve unit includes two switching valves being arranged in series and each including a spring, said two switching valves each being designed and arranged to be switched by said spring and to be electrically switched.

10. The control system of claim 1, wherein said switching valve unit includes a switching valve at least having three positions, namely a first lowering position, a second lifting position and a third driving position and stop position, said switching valve including a spring and being designed and arranged to be switched by said spring and to be electrically switched.

11. The control system of claim 10, wherein said switching valve and said locking valve are designed as one structural unit.

12. The control system of claim 1, wherein said switching valve unit is arranged in said second conduit branch.

13. The control system of claim 1, further comprising:
   a two way valve being designed and arranged to connect said first conduit branch and said second conduit branch; and
   a common conduit leading to said air-suspension bellows, said switching valve unit being arranged in said common conduit.

14. The control system of claim 1, wherein electronic control unit is designed and arranged to process an electric signal corresponding to a driving condition of the vehicle.

15. The control system of claim 1, wherein said level control valve and said path sensor are designed as one common structural unit.

16. The control system of claim 1, wherein said electronic control unit includes a selector switch being designed and arranged to arbitrarily lift and lower the body of the vehicle.

17. The control system of claim 1, further comprising a control valve being located in said first conduit branch and being designed and arranged to arbitrarily lift and lower the body of the vehicle.

18. The control system of claim 1, further comprising a control valve being located in said first conduit branch and being designed and arranged to arbitrarily lift and lower the body of the vehicle and wherein said electronic control unit includes a selector switch being designed and arranged to arbitrarily lift and lower the body of the vehicle.

19. The control system of claim 1, further comprising an outlet to the atmosphere, wherein said air-suspension bellows are designed and arranged to be alternately connected to said source of compressed air and to said outlet to the atmosphere by said level control valve to control and to adjust a desired distance between the body and the axle.

20. A controlling installation for lifting and lowering the body of an air-suspended part of a vehicle including an axle and level control, comprising:

a source of compressed air;

a plurality of air-suspension bellows each being associated with at least one axle and being designed and arranged to adjust a desired distance between the body and the axle;

a path sensor being designed and arranged to sense and determine the distance between the body and the axle and to create and deliver a respective electric signal;

a switching valve unit having a lifting position, a lowering position, a driving position and a stop position;

an electronic control unit being designed and arranged to control said switching valve unit in response to the electric signal delivered by said path sensor;

a first conduit branch being located between said source of compressed air and said air-suspension bellows;

a second conduit branch being located between said source of compressed air and said air-suspension bellows;

at least one level control valve being located in said first conduit branch; and at least one locking valve being located in one of said conduit branches and including a spring, said locking valve being designed and arranged to be electrically switched to reach a first position and to be switched by said spring to reach a second position, said first conduit branch being designed and arranged to be activated in said second position, and said second conduit branch being designed and arranged to be activated in said first position.

21. The installation of claim 20, wherein said first position to be electrically caused is a passage position, and wherein said second position to be caused by said spring is a locking position.

22. The installation of claim 21, wherein said locking valve is located in said first conduit branch and upstream of said level control valve.

23. The installation of claim 21, wherein said locking valve is located in said first conduit branch and downstream of said level control valve.

24. The installation of claim 21, wherein said locking valve is arranged in said second conduit branch.

25. The installation of claim 20, comprising;

a first locking valve being arranged in said first conduit branch and having a locking position and a passage position, the passage position being designed to be adjustable by said spring; and a second locking valve being arranged in said second conduit branch and having a locking position and a passage position, the passage position being designed to be adjustable by said electronic control unit.

26. The installation of claim 20, further comprising:

a first branch location connecting said first conduit branch and said second conduit branch, said first branch location being located close to said source of compressed air; and a common locking valve being located at said first branch location and including a spring, said common locking valve being designed and arranged to be electrically switched to reach a first position and to be switched by said spring to reach a second position, said source of compressed air being connected to said second conduit branch and said first conduit branch being locked in said first position, and said source of compressed air being connected to said first conduit branch and said second conduit branch being locked in said second position.

27. The control system of claim 20, further comprising:

a branch location connecting said first conduit branch and said second conduit branch, said branch location being located next to said air-suspension bellows;

said locking valve is designed as a common locking valve being located at said first branch location and including a spring, said common locking valve being designed and arranged to be electrically switched to reach a first position and to be switched by said spring to reach a second position, said air-suspension bellows being connected to said second conduit branch and said first conduit branch being locked in said first position, and said air-suspension bellows being connected to said first conduit branch and said second conduit branch being locked in said second position.

28. The installation of claim 20, wherein said switching valve unit includes two switching valves being arranged in series and each including a spring, said two switching valves each being designed and arranged to be switched by said spring and to be electrically switched.

29. The installation of claim 20, wherein said switching valve unit includes a switching valve at least having three positions, namely a first lowering position, a second lifting position and a third driving position and stop position, said switching valve including a spring and being designed and arranged to be switched by said spring and to be electrically switched.

30. The installation of claim 29, wherein said switching valve and said locking valve are designed as one structural.

* * * * *